United States Patent [19]
Rumpler

[11] 3,940,798
[45] Feb. 24, 1976

[54] CORE STRUCTURE WITH L-SHAPED BACK MEMBER AND MAGNETIC BONDING MATERIAL

[76] Inventor: Allen G. Rumpler, 5668 Encina Road, Goleta, Calif. 93017

[22] Filed: Sept. 30, 1974

[21] Appl. No.: 510,377

[52] U.S. Cl. .............................. 360/127; 360/121
[51] Int. Cl.² ..................... G11B 5/14; G11B 5/115
[58] Field of Search ........... 360/125, 126, 127, 128, 360/121; 29/603

[56] References Cited
UNITED STATES PATENTS

| | | | |
|---|---|---|---|
| 3,064,333 | 11/1962 | Kristiansen et al. | 29/603 |
| 3,479,738 | 11/1969 | Hanak | 29/603 |
| 3,789,505 | 2/1974 | Huntt | 360/127 |
| 3,808,135 | 4/1974 | Weigel et al. | 29/603 |

*Primary Examiner*—Robert S. Tupper

[57] ABSTRACT

The present invention relates to a magnetic recording head and specifically the back bar of a multi-channel magnetic recording head for use in high performance multitrack disc files. Crosstalk is substantially reduced by incorporating a specially shaped back bar, such as a back bar having an L-shaped cross section to enclose and reduce the crosscoupling fringing fields from the back gaps. In addition, the use of an epoxy with a magnetic filler material is included to further reduce the back gap fringing fields. The above-mentioned techniques when used in combination with a limited dimension intertrack shield can greatly reduce the crosstalk between cores of a high track density flying head.

9 Claims, 5 Drawing Figures

BACK GAP TO BACK GAP FIELDS

GAP TO GAP FIELDS

COIL TO COIL FIELDS

CORE STRUCTURE WITH L-SHAPED BACK MEMBER AND MAGNETIC BONDING MATERIAL

BACKGROUND OF THE INVENTION

1. Field of Invention

The present invention relates to the field of transducers used for the conversion of electrical variations into magnetic variations for the purpose of storage on magnetic media, for reconverting magnetic variations so stored into electrical variations, or for erasing such stored magnetic variations. More particularly, the present invention realtes to read/write heads for digital saturation recording, such as performed in rotating disc digital magnetic storage devices.

2. Description of the Prior Art

The type of magnetic recording head described herein is primarily used in rotating disc magnetic storage devices (hereinafter referred to as "disc files"). These storage devices are used primarily to provide digital storage capacity offering fast access to large amounts of stored information. In general, at the present state of the art, these disc files employ flying heads that may utilize self-actuating air bearings. The heads may be employed in a head-per-track arrangement or in a moving arm arrangement wherein the heads are moved generally along a radius of the disc so that a single head is associated with more than one track. The head-per-track arrangement facilitates rapid access to data since the heads do not have to move from track to track as they do in the moving arm disc file arrangements. The head-per-track arrangement does require a larger number of heads arranged in a relatively dense assembly and it is in such arrangement that the present invention has its greatest application.

The heart of a disc file is the magnetic head itself consisting of a magnetic core having a gap disposed near the media with windings to facilitate conversion of electric currents into magnetic fields. Basically a magnetic core consists of a torroid of magnetic material (generally ferrite in the present case) having a non-magnetic gap formed therein to provide directed magnetic fields that will impinge upon the magnetic recording medium (i.e., disc). This magnetic core takes many different physical forms, in practice primarily to facilitate ease of assembly in the process of manufacturing the complete head assembly. In the case at hand, the gapped torroid configuration is assembled from a gapped U-shaped core ("U-core") and a separate back bar to complete the magnetic circuit (See FIG. 1). This is a very common structure in disc file heads wherein the U-core is first placed into an air bearing slider assembly and later the windings and back bar are attached. This type of structure has the distinct advantage of permitting the coil to be inserted after the formation of the U-core.

As capacity and storage density are increased in the head-per-track disc files, the requirement for closer and closer track spacing becomes evident. As the cores are brought closer together crosstalk between cores becomes a limiting problem. The subject of this invention is a unique structure for reducing crosstalk between cores of the U-core/back bar type.

In previous heads of this head-per-track class, there are several primary sources of coupling between cores as follows (See FIG. 1): (1) Gap-to-gap coupling — in this case fringing fields from one read/write (R/W) gap couples directly into the adjacent R/W gaps; (2) Coil-to-coil coupling — some of the field generated by the write current flowing in the coil fails to couple into the core of the magnetic transducer. This stray field can couple into the adjacent cores or coils to cause write crosstalk; (3) Back gap-to-back gap coupling in this case a second piece of magnetic material is placed in physical contact with the U-core. Even though all surfaces are as flat as possible and polished to a very smooth finish, there will exist some air gap at the interfaces between the U-core legs and the back bar. These so-called back gaps provide a fringing field for cross-coupling between cores.

BRIEF SUMMARY OF THE INVENTION

The present invention is a combination of elements whereby crosstalk is substantially reduced in a multi-core magnetic head of dimensions sufficiently small to allow the processing of a plurality of tracks (e.g., nine) having track-to-track spacing in the order of 0.050 inches carried by a single air bearing slider of dimensions of approximately 0.5 by 0.5 inches. More particularly, the present invention relates to the structure of a back bar in combination with magnetic shields between adjacent magnetic cores wherein back gap-to-back gap leakage flux, coil-to-coil leakage flux and crosstalk are substantially reduced.

In thè preferred embodiment, a back bar having an L-shaped cross section is used. In order to insure good contact with the U-core a rectangular groove is cut into the interior surface of the L-back bar so that there will be no interior radius. (FIG. 2 shows this L-shaped back bar in place on the U-core.)

Another aspect of this invention is the use of ferrite filled epoxy to bond the back bar onto the U-core. The ferrite epoxy when placed over the back gap joints provides a low magnetic reluctance shunt path for the back gap fields and contains the crosstalk fringing fields.

A further aspect of the present invention relates to the use of a limited electromagnetic shield between cores of the multi-core flying head. The technique of using laminated copper/mu metal shields between tracks of multitrack tape heads is well known. This shielding could be used to reduce the crosstalk in the present case to acceptable levels if it were not for physical space limitations. In tape heads, the shields are extended in dimension far beyond the perimeters of the core structures in order to contain the fringing fields shown in FIG. 1. It is particularly necessary to extend the intertrack shield far above the back bar in order for the shielding to be effective. In the flying head case, vertical space limitations and low mass requirements of the air bearing assembly are severe, limiting the extension of the shield. In one of the embodiments of the invention the shields are flush with the top of the core and back bar. Also, in order to accommodate the preferred construction technique the shield cannot extend through the air bearing surface to the face of the head. it is within the scope of the invention to extend the shield to the extent possible or to reduce the extent of the shield so that it is not flush with the top of the core or the back bar.

in combination, the height restricted intertrack shield, L-shaped back bar, and ferrite epoxy provide a far reduced crosstalk performance in a multicore flying disc head. As a matter of fact, crosstalk can be substantially reduced by using only the L-shaped back bar and ferrite epoxy technique. A quantitative measure of the relative crosstalk performance in the case at hand under certain test conditions is as follows:

Case 1 — Standard back bar (as in FIG. 1) = 11 percent

Case 2 — L-shaped back bar, ferrite epoxy, and no shield crosstalk = 5 percent

Case 3 — L-shaped back bar, ferrite epoxy, short shield (height equal core height) crosstalk = 2 percent (It should be noted that test parameters may be selected so that the results differ but is is believed the relative improvement in performance will be substantially similar).

The L-shaped back bar is the preferred embodiment of the present invention for reasons of manufacturing simplicity. An alternate solution from a magnetic shielding technique would employ a back bar with a U-shaped cross section. It can be seen that the U-shaped cross section provides even more complete shielding of the back gap fringing fields than does the L-shaped back bar since it fully encloses the top of the U-core but is is substantially more difficult to manufacture and to precisely fit to the core. It is also within the broad scope of the invention to apply the invention to other types of heads, such as tape heads, drum heads, video heads, and read after write heads.

With the above brief description in mind, it is one object of the present invention to provide a stucture for a multi-channel magnetic transducer whereby flux leakages and crosstalk between adjacent channels may be substantially reduced.

It is another object of the present invention to provide a structure for a multi-channel magnetic transducer capable of simultaneously processing numerous separate tracks of information on a magnetic disc in such a fashion that crosstalk is substantially eliminated between adjacent tracks.

It is yet another obejct of the present invention to provide a structure for a multi-channel magnetic transducer capable of independent processing of a multiplicity of separate channels of information at high frequencies on a disc without substantial reduction in sensitivity in such a manner that crosstalk between adjacent channels is substantially reduced.

It is also an object of the present invention to provide a structure capable of substantially reducing crosstalk between channels in a multi-channel transducer by means of altering the back bar of the magnetic core and employing epoxy filled with magnetic material as a back gap adhesive.

The novel features which are believed to be characteristic of the invention, both as to its organization and method of operation, together with further objectives and advantages thereof will be better understood from the following description considered in connection with the accompanying drawing in which a presently preferred embodiment of the invention is illustrated by way of example. It is to be expressly understood, however, that the drawing is for the purpose of illustration and description only and and is not intended as a definition of the limits of the invention.

DETAILED DESCRIPTION OF THE INVENTION

Figure 1:
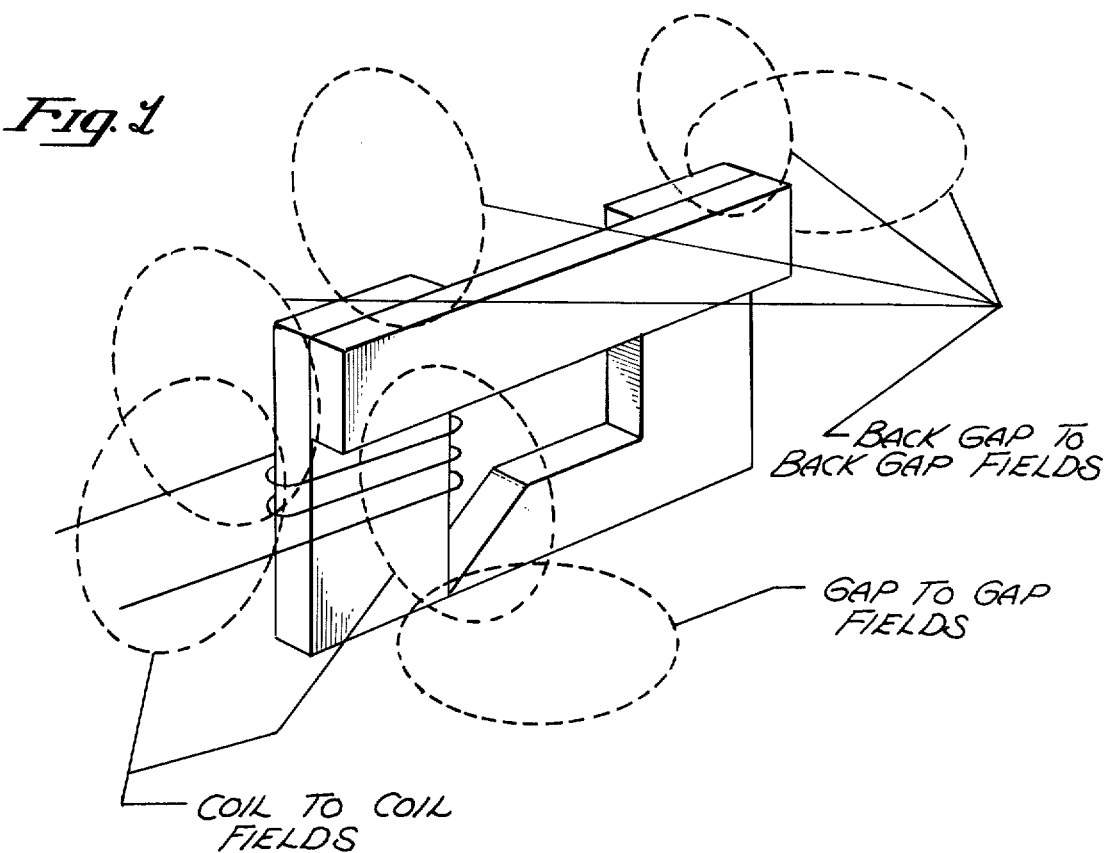
FIG. 1 is a perspective view of a single core of a prior art magnetic head.
Figure 2:
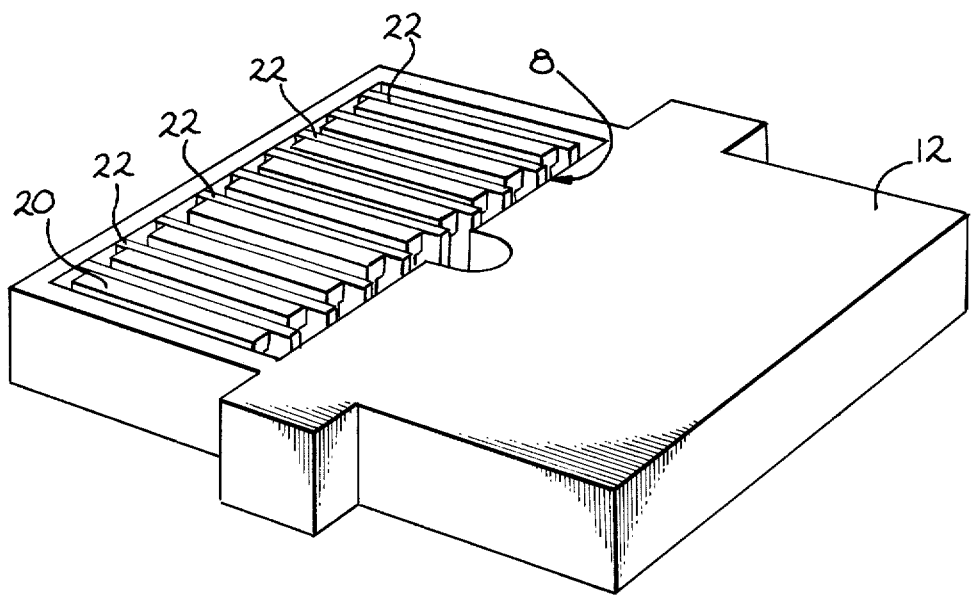
FIG. 2 is a top view perspective of a preferred embodiment of the present invention illustrating a multi-channel magnetic transducer assembly containing a multiplicity of magnetic cores and associated magnetic shields. The magnetic cores are recessed into a cavity in the magnetic transducer assembly and only the tops of the magnetic shields and the back bar of the magnetic cores are visible.

Referring to FIG. 2 an embodiment of a multi-channel magnetic transducer is illustrated showing the magnetic cores and shielding inserted into a cavity within the magnetic transducer assembly. Magnetic transducer body 12 may be made of any suitable electrically passivating substance, such as ceramic or glass. In practice, body 12 may be no more than approximately one eighth inch thick and approximately one-half inch square. Only the tops of magnetic shields 22 and the back bar 20 of the core 8 are visible in FIG. 2. Note that magnetic shield 22 is interleaved between each magnetic core 8 and brackets the magnetic cores. (It is entirely within the scope of the present invention that the lateral surface of each magnetic shield 22 may be approximately of the same area as the lateral surface of each magnetic core 8 as illustrated.) The shields may be slightly larger or slightly smaller from an area standpoint than magnetic cores 8. In one embodiment the shields are longer than magnetic core 8 but not higher than the cores when installed. (E.g., in FIG. 4, the L-bar length (L) may be 0.135 inches and the shield may be 0.180 inches long.)

Figure 3:
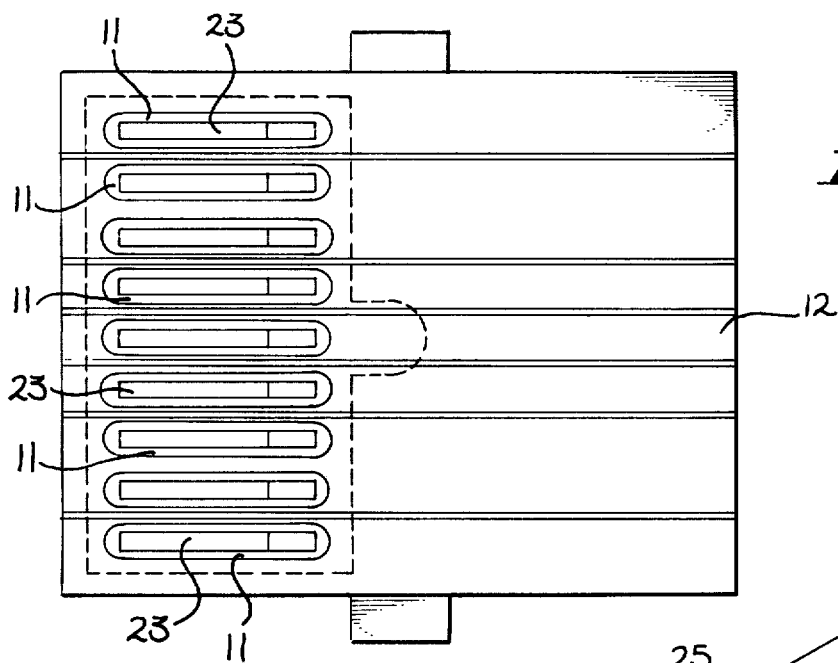
FIG. 3 is a top view of the front of a preferred embodiment of the present invention illustrating the relative placement of the magnetic cores in a multi-channel magnetic transducer assembly. The front gaps of the magnetic cores are shown.

Referring now to FIG. 3, assembly body 12 is shown wherein it is illustrated in the preferred embodiment that U-cores 23 extend through assembly body 12 by means of apertures provided therein and form with body 12 a smooth planar surface suitable for flight over a magnetic storage media. By way of example only, the position of each U-core 23 in the magnetic core stack is fixed by a bonding agent 11 which is disposed in the apertures provided in assembly body 12 for U-cores 23. The bonding agent may be glass or epoxy.

Figure 4:
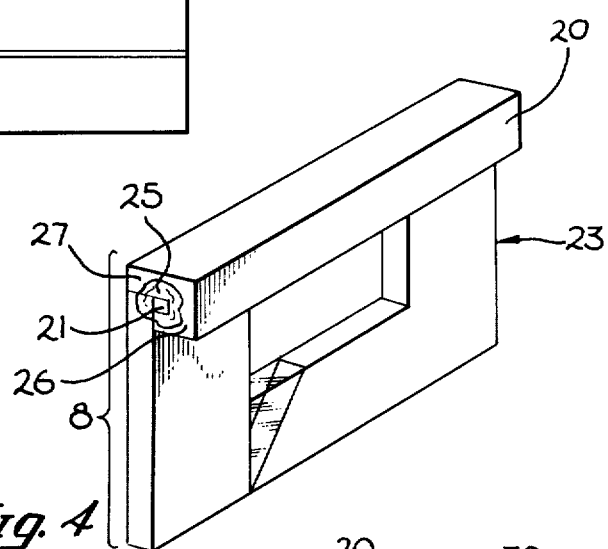
FIG. 4 is a perspective view of a single magnetic core of the preferred embodiment of the present invention illustrating the M-core and back bar and their relative placement. Wire windings or other means for inducing or converting magnetic variations within the loop to electrical variations are omitted for the purpose of clarity.

FIG. 4 illustrates a preferred embodiment of a single magnetic core 8. The core is comprised of a U-core 23 and back bar 20. By way of example only, U-core 23 is shown as a two-piece construction in the form of a squared U connected by a non-magnetic gap which may be glass such as is well known in the art. The U-core and back bar of the magnetic core may be made out of any suitable magnetic material, which in the preferred embodiment may be any one of a number of ferrite compounds well known in the art. Back bar 20 in the preferred form has a cross section approximately in the shape of the letter L. More particularly, prismatic back bar 20 is comprised of two arms 26 and 27. Back bar 20 is bonded to U-core 23 by means of a ferrite filled epoxy 25. Back bar 20 is placed such that the interior surface of arms 26 and 27 is contiguous to a surfaces of U-core 23. The ferrite filled epoxy is placed on the ends of bar 20 after the bar makes intimate contact with the U-core 23 and the epoxy is placed at the end of bar 20 so that it at least covers substantially all of the gants or gaps. The epoxy may be filled with other magnetic material. The back bar may have more than two legs although a bar with a U-shaped cross section is less pratical to manufacture. The terms "U-core," "U-type" or "U-shaped" core as employed herein is not intended to define a specific configuration but as employed refers to a part of a core that does not form a continuous closed magnetic path but has a discontinuity forming an air gap therein and requires an additional member to complete the magnetic path.

Figure 5:
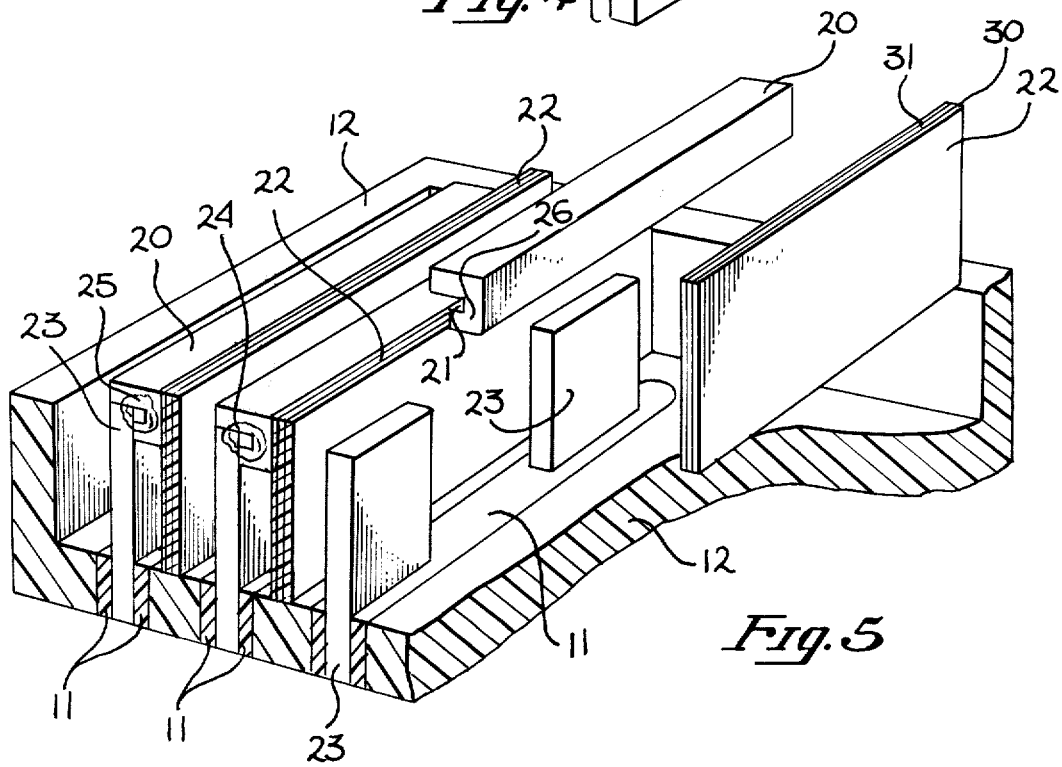
FIG. 5 is a perspective view of a section of a multi-channel magnetic transducer and illustrates the structure of the laminated magnetic shield and its combination with the magnetic cores of the preferred embodiment in the magnetic transducer assembly such that the beneficial results claimed by the applicant are achieved.

Referring finally to FIG. 5, a section of a multi-channel magnetic transducer is shown wherein the elements of the present invention are combined to effect a substantial reduction in crosstalk. Assembly body 12 is shown with the apertures made therein through which U-cores 23 are inserted and fixed by bonding agent 11 (e.g., glass). By way of example, only three magnetic cores are illustrated, one of which is shown in an exploded view. FIG. 5 illustrates the manner in which the magnetic cores are stacked in a parallel and linear arrangement and how the components of each core are arranged. Wire windings or other means for transformation of electrical to magnetic variations in the core have been omitted for the sake of clarity. It should be noted that the use of a glass bonding agent (and a glass gap) in connection with head-per-track arrangements has particular advantages in comparision to employing epoxy bonding agents in the vicinity of the magnetic media. Glass had improved wear and stability characteristics. The use of glass does require that the U-core be subjected to higher temperatures during manufacture. Such high temperature would tend to damage the wires, comprising the coil in the event such coils were in place during such glass formation. Thus it is important when employing glass that a U-core structure as shown be employed as such a structure enables the back bar and coil to be attached to the U-core after it is bonded in place in the assembly by the glass.

Back bar 20 which by way of example only is machined to be in the form of a prism with an approximately L-shaped cross section. Back bar 20 can be conceptualized as consisting of two arms 26 and 27. Arm 27 is contiguous to the butt end of the side arms of U-core 23. The interior surfaces of arms 26 and 27 are bonded to the lateral and butt ends of side arms of U-core 23 as shown in FIG. 5. A ferrite filled epoxy 25 serves as a bonding agent to secure back bar 20 to side arms of U-core 23. A laminated magnetic shield 22 is placed between each magnetic core in the core stack so as to be substantially parallel to the plane of the magnetic core and to be contiguous to the exterior surface of arm 26 of back bar 20. It is not essential that shield 22 be contiguous with U-core 23 or back bar 20. Magnetic shield 22 may or may not extend beyond the perimeters of each magnetic core. The shield 22 is more effective when extended beyond the perimeters of the core.

Laminated magnetic shield 22 may consist of three layers which are of equal thickness. The thickness of each layer is typically not more than one thousandth of an inch. The outer two layers 30 of magnetic shield 22 consist of metallic alloy exhibiting a high permeability. For example, outer layers may consist of a nickel alloy principally containing nickel, iron or cobalt. One such alloy is known to the art under the generic designation Hi mu 80. It is reported that such alloys typically exhibit specific permeabilities in excess of 50,000. The inner layer 31 may be a conductive material such as copper. Shields thus constructed and positioned serve to substantially reduce fringing and leaking magnetic and electric fields linking one core to an adjacent core.

The reduction and elimination of crosstalic between cores is significantly enhanced by the use of laminated shields 22 constructed as specified herein in combination with back bar 20. The back bar 20 minimizes the amount of flux leakage escaping from the given core while at the same time incorporating an effective and simple design suitable for use in construction of small cores without introducing significant cost of construction. What flux leakage may occur is further reduced by the use of a ferrite filled epoxy 25 at the ends of the back bar to fix the back bar 20 to the U-core 23. Finally, any flux leakage remaining is further eliminated by interleaving magnetic shields 22.

It is possible that further modifications and additions may be made by those with ordinary skill in the art without departing from the spirit and scope of the present invention.

I claim:

1. A magnetic head capable of converting electrical variations into magnetic variations, and magnetic variations into electrical variations to impinge a magnetic media, said magnetic head comprising:
   a plurality of magnetic cores each comprising:
      a U-type core having a non-magnetic gap adjacent said magnetic media;
      a magnetic bar having a plurality of legs, forming the shape of a prism and having surfaces contiguous to said U-type core to provide a closed magnetic circuit;
      a bonding means for bonding said magnetic bar to said U-type core and for magnetically coupling said magnetic bar with said U-type core, said bonding means containing a magnetic material; and a plurality of magnetic flux shields, one of said plurality disposed between each pair of magnetic cores of said plurality of magnetic cores.

2. The structure of claim 1 wherein said bar has at least two legs with at least two legs contiguous with said U-type core.

3. The structure of claim 1 wherein said magnetic flux shields have a high magnetic permeability and extend beyond said U-type core.

4. The structure of claim 1 wherein:
   said magnetic flux shield is a lamination of conductive and magnetic layers having a high permeability.

5. The structure of claim 1 wherein said bonding means is a ferrite filled epoxy.

6. A magnetic head for a disc file, said head capable of converting electric variations into magnetic variations impinging a magnetic media, comprising
   an assembly body means to provide rigid structural support for a plurality of magnetic cores, to provide electrically insulative separation between each of said magnetic cores, and to provide a rigid, mechanical separation and spacing to fix the relative position of each magnetic core with respect to every other magnetic core;

a plurality of magnetic cores fixed in said assembly body each comprising:
- a ferrite U-type core embedded in and extending through said body to, with said body, provide a smooth surface proximate said magnetic media;
- a non-magnetic front gap in said U-type core;
- a ferrite back bar contiguous to said U-type core and in the shape of a prism with an L-shaped cross section, said bar positioned to form a closed magnetic circuit across said U-type core;
- a ferrite filled epoxy disposed to bond said bar to said U-type core whereby magnetic flux leakage is substantially reduced; and
- a plurality of magnetic shields separating each magnetic core from the adjacent magnetic core.

7. The structure of claim 6 wherein:
said cores are bonded to said assembly with a glass bonding agent and said gap is a glass.

8. A magnetic head capable of converting electrical variations into magnetic variations to impinge a magnetic media, said magnetic head comprising:
a plurality of magnetic cores each comprising:
- a U-type core having a non-magnetic gap adjacent said magnetic media;
- a magnetic bar having an L-shaped cross section and formed in the shape of a prism, said magnetic bar having surfaces contiguous to said U-type core to provide a closed magnetic circuit; and
- a bonding means disposed to bond said U-type core and bar together.

9. A magnetic head capable of converting electric variations into magnetic variations impinging a magnetic media, comprising:
an assembly body means to provide rigid structural support for a plurality of magnetic cores, to provide electrically insulative separation between each of said magnetic cores, and to provide a rigid, mechanical separation and spacing to fix the relative position of each magnetic core with respect to every other magnetic core;

a plurality of magnetic cores fixed in said assembly body each comprising:
- a ferrite U-type core embedded in and extending through said body to, with said body, provide a smooth surface proximate said magnetic media;
- a non-magnetic front gap in said U-type core;
- a ferrite back bar contiguous to said U-type core and in the shape of a prism with an L-shaped cross section, said bar positioned to form a closed magnetic circuit across said U-type core;
- a ferrite filled epoxy disposed to bond said bar to said U-type core whereby magnetic flux leakage is substantially reduced; and
- a plurality of magnetic shields separating each magnetic core from the adjacent magnetic core.

* * * * *